United States Patent [19]

Aoyagi et al.

[11] Patent Number: 5,042,025

[45] Date of Patent: Aug. 20, 1991

[54] ROTATION CONTROL SYSTEM FOR DISK PLAYER

[75] Inventors: Yoshio Aoyagi; Hiroyuki Abe, both of Saitama, Japan

[73] Assignee: Pioneer Electronic Corporation, Tokyo, Japan

[21] Appl. No.: 383,398

[22] Filed: Jul. 21, 1989

[30] Foreign Application Priority Data

Dec. 27, 1988 [JP] Japan .................. 63-327865

[51] Int. Cl.$^5$ .................................. G11B 25/04
[52] U.S. Cl. ........................ 369/190; 369/188; 369/266; 369/239
[58] Field of Search ........... 369/266, 240, 106, 752, 369/77.1, 133, 185, 188, 187, 190, 239, 263, 265, 267; 318/772, 807

[56] References Cited

U.S. PATENT DOCUMENTS

| | | | |
|---|---|---|---|
| 4,098,510 | 4/1978 | Suzuki et al. | 369/239 |
| 4,302,833 | 11/1981 | Tanaka et al. | 369/239 |
| 4,416,006 | 11/1983 | Kitnamura et al. | 369/240 |
| 4,653,090 | 3/1987 | Senso | 369/239 |
| 4,695,995 | 9/1987 | Koizumi | 369/267 |
| 4,742,508 | 5/1988 | Lee et al. | 369/265 |
| 4,773,057 | 9/1988 | Otsuka et al. | 369/75.2 |
| 4,797,869 | 1/1989 | Hirano | 369/75.2 |

FOREIGN PATENT DOCUMENTS 3533647 3/1986 Fed. Rep. of Germany.
3700621 4/1987 Fed. Rep. of Germany.

*Primary Examiner*—William M. Shoop, Jr.
*Assistant Examiner*—John W. Cabeca
*Attorney, Agent, or Firm*—Sughrue, Mion, Zinn Macpeak & Seas

[57] ABSTRACT

A rotation control system for disk player in which the player detects the size of a disk housed in the player, varies the starting torque to be given to the disk motor in response to the detected size, and controls the disk motor so as to require substantially the same length of time before a prescribed rotational frequency is attained, irrespective of the size of the disk.

3 Claims, 3 Drawing Sheets

ROTATION CONTROL SYSTEM FOR DISK PLAYER

BACKGROUND OF THE INVENTION

The present invention relates to a rotation control system for a disk player which reproduces disks of different sizes, and more particularly to a rotation control system which operates during starting of a disk motor.

In reproducing signals from an optical disk such as a digital audio disk or a video disk, it first is necessary to focus a laser beam on the disk surface by adjusting the position of the objective lens of an optical pickup.

In adjusting the focus, a method is employed in which the objective lens is oscillated in the perpendicular direction with respect to the disk by means of an output signal (1-2 Hz) of an oscillation circuit (referred to as a focus search circuit), while keeping the objective lens of the optical pickup a certain distance away from the disk. A focus servo loop is turned on immediately upon detection of an error signal with approach of the focal depth of the objective lens to the reflection surface of the disk, and the objective lens is drawn within the focal depth and the focus search circuit turned off simultaneously.

In this case focus adjustment may be carried out in a condition where the disk is kept stationary. However, sometimes focus drawing is not feasible because of pits that are found in the vicinity of a position to which the beam of light is pointed. In particular, in the case of a disk player in a vehicle, there is an inconvenience that focus adjustment is difficult due to the influence of vibrations of the vehicle. For this reason, a stabilized focus drawing will become realizable if the influence of the pits at the position where the beam of light is pointed is averaged out by adjusting the focus in a condition in which the disk is kept rotating.

Now, currently, there are available two kinds of digital audio disks; a large-sized disk with an outer diameter of 12 cm and maximum reproduction time of about 75 minutes; and a small-sized disk with an outer diameter of 8 cm and maximum reproduction time of about 20 minutes. Since the optical pickup reads both kinds of disk the same way, there have been developed disk players available for reproducing disks of different sizes.

With such disk players, there has arisen an inconvenience in that the time taken by the disk motor to attain a prescribed rotational frequency, for example, the rotational frequency at which the influence of the pits is averaged out (about 20 rpm), varies with the size of the disk, since the weight of the disk varies with the size of the disk, assuming that the starting torque of the disk motor remains constant. In particular, in the case of installing a disk motor within a limited housing space such as in the case of a disk player for vehicles, the tendency becomes more apparent because it is not possible to use a motor with a performance margin.

SUMMARY OF THE INVENTION

Therefore, it is one object of the present invention to provide a disk player which is capable of attaining a prescribed rotational frequency in substantially the same length of time for disks of different sizes using the same player.

In the present invention, the disk player detects the size of a disk housed in the player, varies the starting torque to be given to the disk motor in response to the size of the disk detected, and controls the disk motor so as to require substantially the same length of time before a prescribed rotational frequency is attained, irrespective of disk size.

First, the size of a disk housed in the disk player is detected, and the disk motor is controlled in such a way that a large starting torque is given to the disk motor when the size of the disk is found to be large, whereas a smaller starting torque is given to the disk motor when the size of the disk is found to be small, so that the time required for the disk motor to attain a prescribed rotational frequency from the stationary state is substantially identical for a disk of any size.

At the time when the rotational frequency of the disk motor reaches a predetermined value, about 20 rpm, for example, focusing of the optical pickup is begun. Since focusing takes place while the disk is rotating, the influence of the pits is averaged out, and the focusing can be executed in a stable manner. Upon completion of the focusing and extraction of a reproducing clock, a CLV (constant linear velocity) servo is turned on to form a closed servo loop. Thereafter, the disk motor is controlled by the CLV servo so as to be rotated with a constant linear velocity in order to carry out reproduction of information recorded on the disk.

BRIEF DESCRIPTION OF THE DRAWINGS

The above and further objects, features and advantages of the present invention will become more apparent from the following detailed description taken in conjunction with the accompanying drawings, wherein.

DETAILED DESCRIPTION OF A PREFERRED EMBODIMENT

Figure 1:
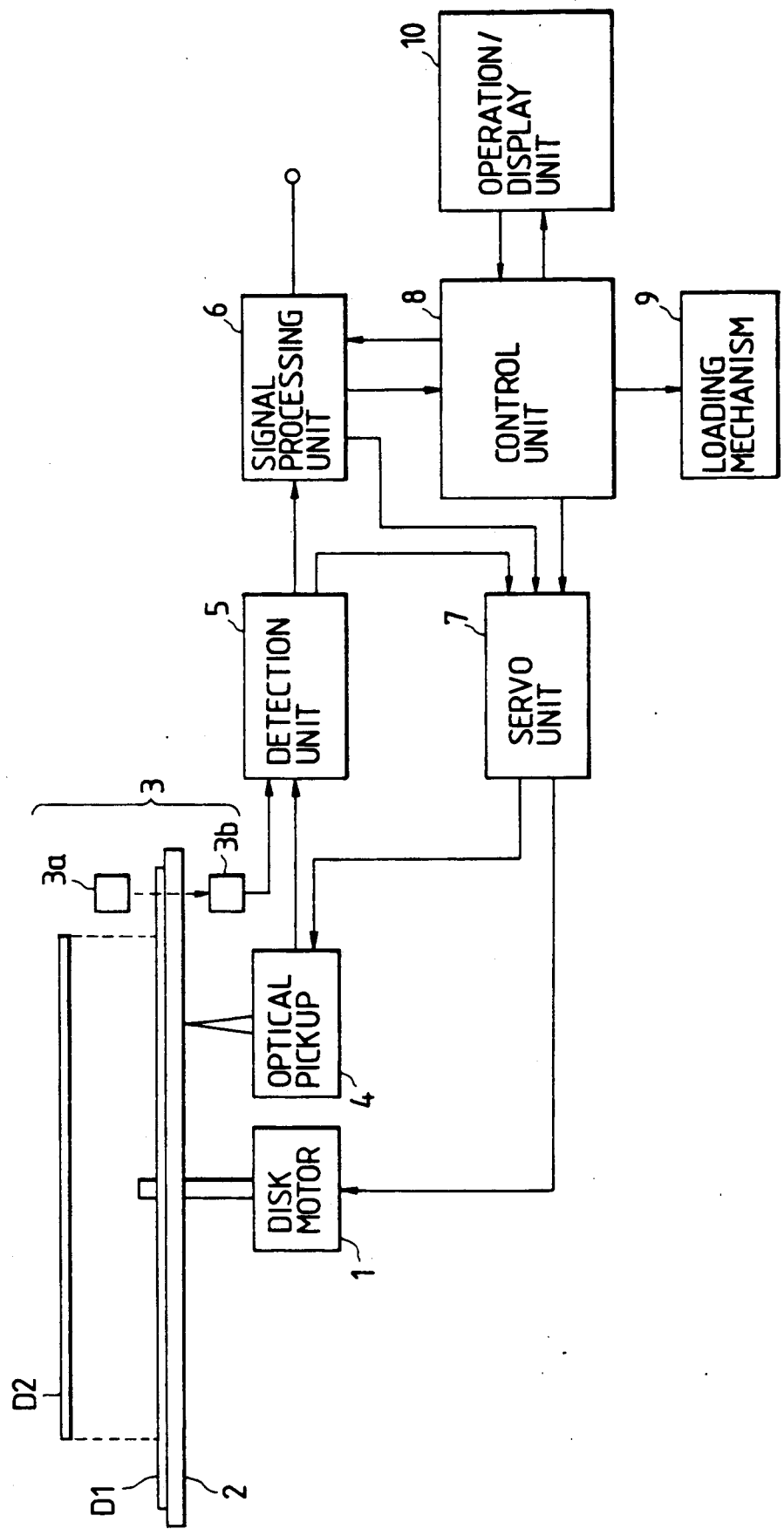
FIG. 1 is a block diagram showing one embodiment of the present invention.

FIG. 1 is a block diagram showing the constitution of the digital audio disk player in accordance with one embodiment of the present invention. In the Figure, a disk motor 1 rotates a disk D1 or D2, placed on a tray 2, with a prescribed linear velocity, which for a compact disk player is 1.2-1.4 m/s. The disk D1 has an outer diameter of 12 cm and a playing time (for one side) of a maximum of about 75 minutes, whereas the disk D2 has an outer diameter of 8 cm and a playing time (for one side) of a maximum of about 20 minutes.

A disk size detector 3 consists of a light-emitting diode 3a and a photodiode 3b, provided between the periphery of the disk D1 and the periphery of the disk D2 placed on the tray 2 in the perpendicular direction with the tray 2 in between, and detects the size of the disk D1 or D2 placed on the tray 2. When the disk D1 is placed on the tray 2, light from the light-emitting diode 3a is blocked by the disk D1, and when the disk D2 is placed on the tray 2, light from the light-emitting diode 3a is received by the photodiode 3b. In this way, the size of a disk placed on the tray 2 is detected by the presence or absence of received light at the photodiode 3b.

Both of the disks D1 and D2 (hereinafter referred to as disk D) are constructed respectively by three regions from the inside toward the outside: a read-in area where a TOC (table of contents) is recorded; a program area where music information is recorded; and a read-out area where a program completion signal is recorded. The TOC recorded in the read-in area contains information on the contents such as the number of pieces of music recorded in the disk, address (position on the disk) for each of start, pause, end and the like of each piece of music, playing time of each piece of music, total playing time of the disk and the like, this information being recorded repeatedly until the start position of the pieces of music recorded in the program area begins. The pieces of music information recorded in the program area consist of synchronizing signals, a subcode in which are recorded control information and expanded function information, information bits in which music signals are recorded, and a plurality of frames having error correction bits for correcting errors in the music bits as one frame. The address information is recorded in the subcode.

Each piece of information recorded in the disk D is read by an optical pickup 4 and supplied to a detection unit 5. In the detection unit 5, recorded signals are read from among the photoelectrically converted signals by the optical pickup 4 and are sent to a signal processing unit 6, and error signals in focusing, tracking and the like are output to a servo unit 7.

In the signal processing unit 6, recorded signals detected by the detection unit 5 are waveform shaped and converted to digital signals. Detection of synchronizing signals, demodulation of music signals, detection of subcodes and the like, and the music signals are output as analog audio signals after D/A conversion. Further, the signal processing unit 6 outputs a part of the synchronizing signals and the subcodes to the servo unit 7 and a control unit 8, respectively.

In servo unit 7, a focus coil of the optical pickup 4 is controlled based on the error signal from the detection unit 5, frame synchronizing signals from the signal processing unit 6 and control signals from the control unit 8, and servo signals are formed for such servos as a focus servo for focusing the laser beam on the reflection surface of the disk D, a tracking servo for radiating the laser beam along a predetermined track by controlling a tracking coil of the optical pickup 4, a carriage servo for moving the main body of the optical pickup 4 along the radial direction of the disk D by controlling the carriage motor and a CLV (constant linear velocity) servo for controlling the disk motor 1 to a constant linear velocity The control unit 8, comprising a microcomputer, outputs control signals for controlling various parts, and controls a loading mechanism 9 which carries out the loading and unloading of a disk D in the player.

An operation/display unit 10 includes a group of operating switches for controlling the player, such as a play switch for reproducing music information recorded in a disk D, a stop switch for stopping reproduction, and an eject switch for ejecting the disk D from the player. There also is provided an annunciator group consisting of an annunciator for showing that the operation for each of the above-mentioned operating switches is correct, an annunciator for showing the number and the playing time of the music being reproduced, and the like.

Figure 2:
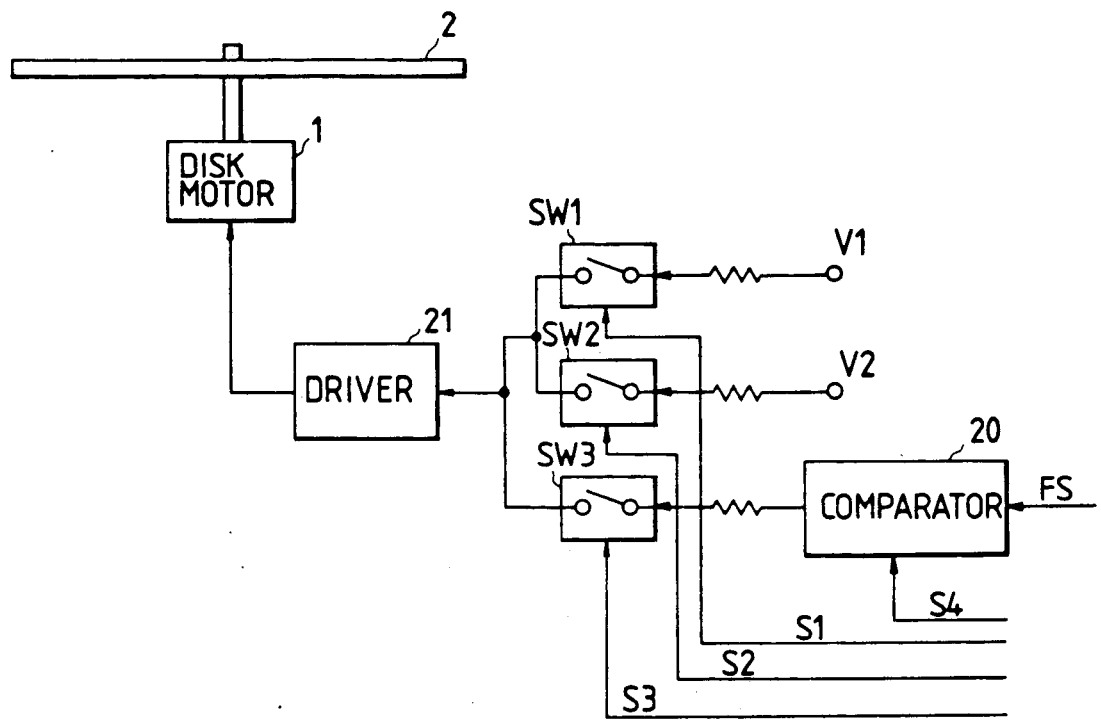
FIG. 2 is a block diagram showing an outline of the CLV servo.

FIG. 2 is a block diagram of the CLV servo in the servo unit 7. The CLV servo is a device for controlling the disk motor 1 so as to rotate at a constant linear velocity. It compares, in a comparator 20, a frame synchronizing signal FS detected in the signal processing unit 6 with a high precision system clock which is crystal locked, and carries out, via a driver 21, the control of raising the rotational frequency by increasing the voltage applied to the disk motor 1 in case the frequency of the signal FS is lower than that of the system clock, and lowering the rotational frequency by decreasing the applied voltage in case the frequency of the signal FS is higher than that of the system clock.

Further, in the driver 21 there are supplied dc signals $V_1$ and $V_2$ ($V_2 < V_1$) via switches $SW_1$ and $SW_2$ for providing a rotation starting torque to the disk motor at the time of starting the motor. In addition, a switch $SW_3$ is provided between the comparator 20 and the driver 21, and the CLV servo is shut off at the time of starting by this switch $SW_3$. These switches $SW_1$–$SW_3$ and the comparator 20 are controlled by control signals $SW_1$–$SW_4$ from the control unit 8.

Figure 4:
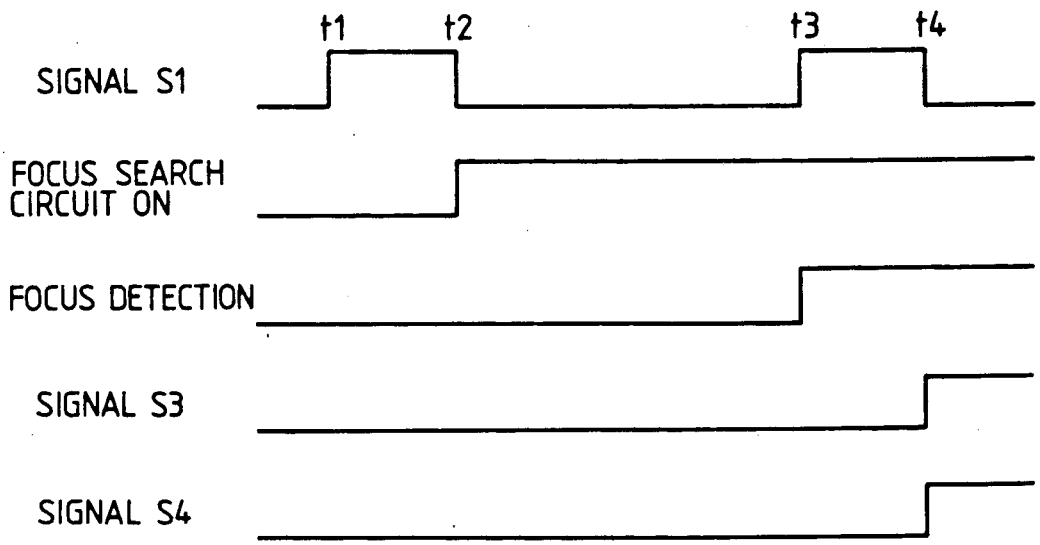
FIG. 4 is a timing chart for explaining the operation of the present embodiment.
Figure 3:
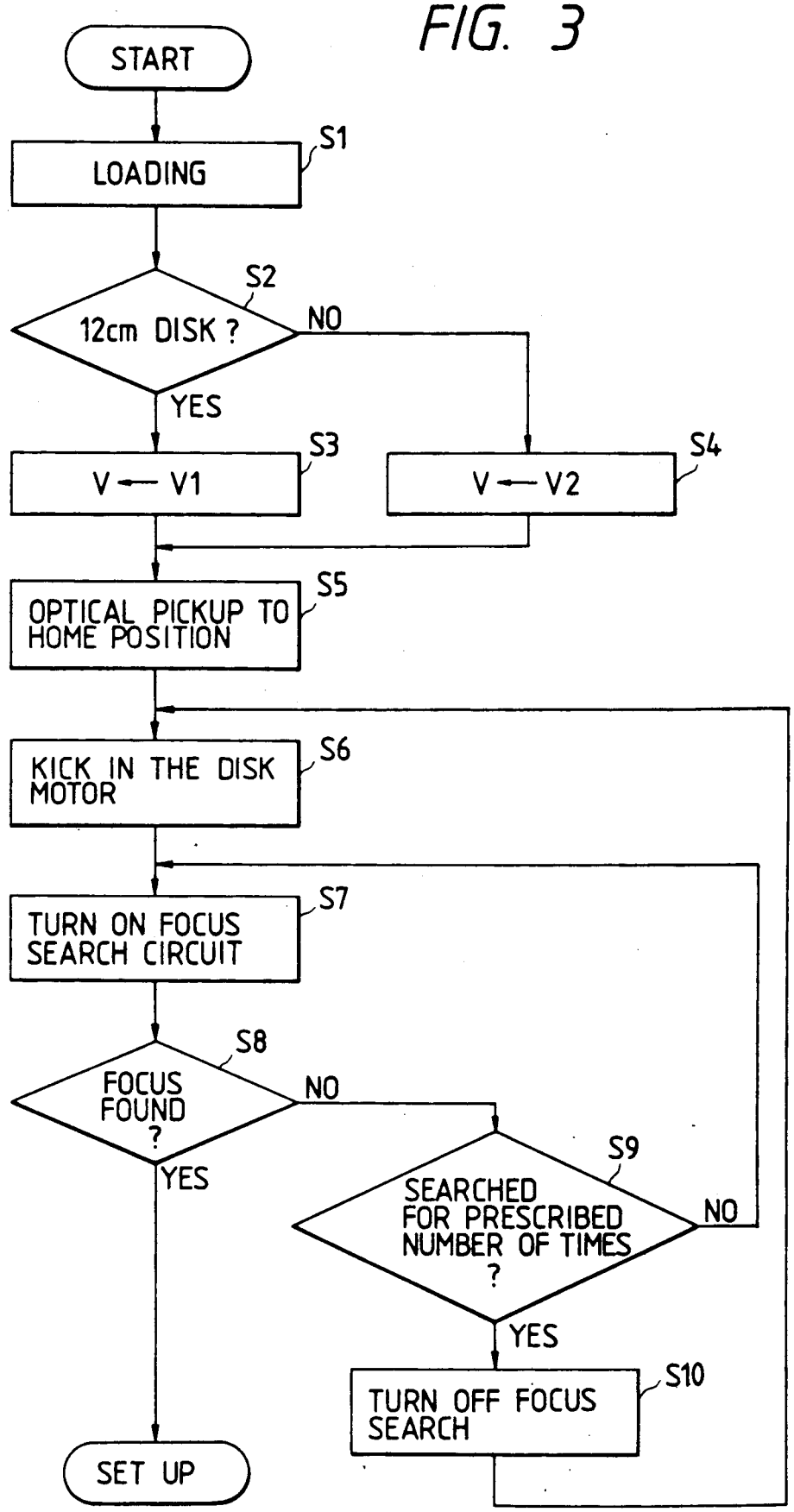
FIG. 3 is a flow chart explaining the operation of the present embodiment.

Next, referring to the flow chart shown in FIG. 3 and the timing chart shown in FIG. 4, the operation of the just-described embodiment will be described, centering around the operation at the time of starting the disk motor 1.

First a disk D1 is housed inside the player using the loading mechanism (step S1), and the disk size detector 3 detects which of a 12 cm disk or an 8 cm disk is housed (step S2). The dc signal $V_1$ is selected as the starting signal if a 12 cm disk is housed (step S3), and the dc signal $V_2$ is selected if an 8 cm disk is housed (step S4). Since the disk D1 was housed in the present case, the dc signal $V_1$ is selected.

Next, the optical pickup 4 is moved to the vicinity of TOC (referred to as home position hereinafter) where focusing is easier to execute (step S5), the control signal $S_1$ for selecting the dc signal $V_1$ is brought to an H level at time $t_1$, and the switch $SW_1$ is closed. By supplying the dc signal $V_1$ to the driver 21 in this manner, the driver 21 gives the torque for starting the 12 cm disk to the disk motor 1 (step S6).

The disk motor 1 is accelerated until time $t_2$, and when the rotational frequency reaches the lowest limit at which focusing can be taken (about 20 rpm), the control signal $S_1$ is returned to an L level, and the focus search circuit is turned on (step S7).

When focusing is achieved at time $t_3$ (step S8), the control signal $S_1$ is set to the H level again, and a second acceleration operation is continued until the time $t_4$. After $t_4$, the control signals $S_3$ and $S_4$, instead of the control signal $S_1$, are brought to the H level, and the closed loop of the CLV servo is formed by closing the switch $SW_3$ and enabling the operation of the comparator 20. Thereafter, the disk motor 1 is controlled so as to be rotated at a constant linear velocity (1.2–1.4 m/s) by the CLV servo.

It should be noted that the foregoing has been provided with reference to the case of starting the disk $D_1$. However, to start the disk $D_2$, the only difference is that the switch $SW_2$ is closed instead of the switch $SW_1$, and the dc signal $V_2(<V_1)$ is supplied to the driver 21 instead of $V_1$.

Thus, as described above, in accordance with the present invention, it is possible to set the time required before reaching a prescribed rotational frequency to be substantially the same, irrespective of the size of the disk to be reproduced.

What is claimed is:

1. In a disk player comprising a disk motor and means for reproducing disks of at least first and second diameters, a rotation control system for said disk player, comprising:
   means for detecting a diameter of one of said disks that is housed in the disk player and providing an output accordingly;
   means for adjusting a starting torque to be given to said one of said disks motor according to the diameter thereof; and
   means for rotating the disk motor such that a timer required for the disk motor to achieve a prescribed rotational frequency is regulated to be substantially the same irrespective of the diameter of the disk to be reproduced.

2. A rotation control system as claimed in claim 1, wherein said prescribed rotational frequency is the rotational frequency at which an influence of pits in the disk is averaged out at the time focusing of a laser beam on a surface of the disk.

3. A rotation control system as claimed in claim 2, wherein said prescribed rotational frequency is 20 rpm.

* * * * *